April 12, 1949.  J. M. OWEN  2,466,821
HELICOPTER
Filed Oct. 23, 1944  4 Sheets-Sheet 1
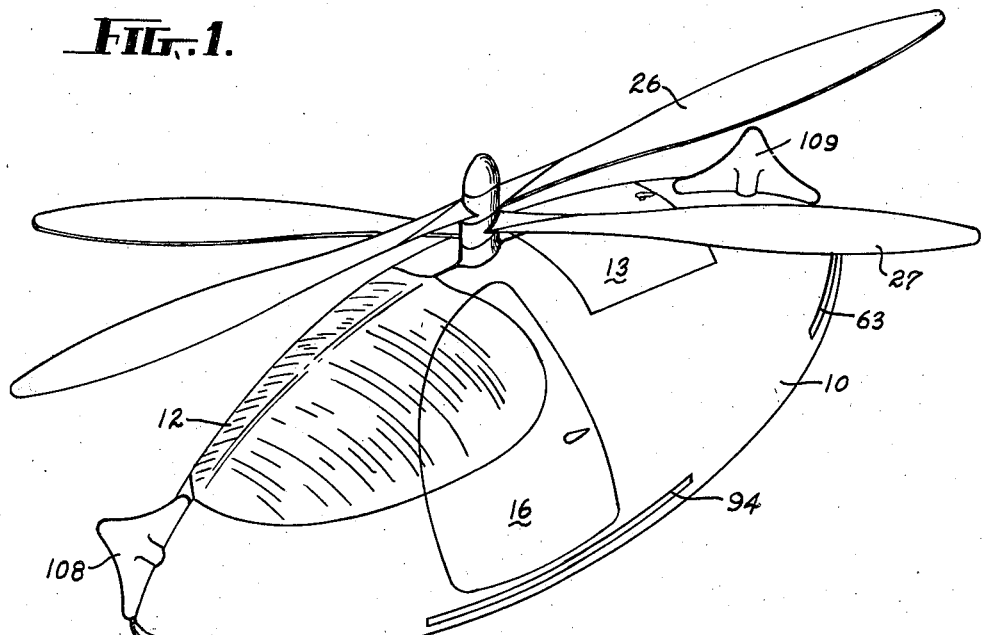
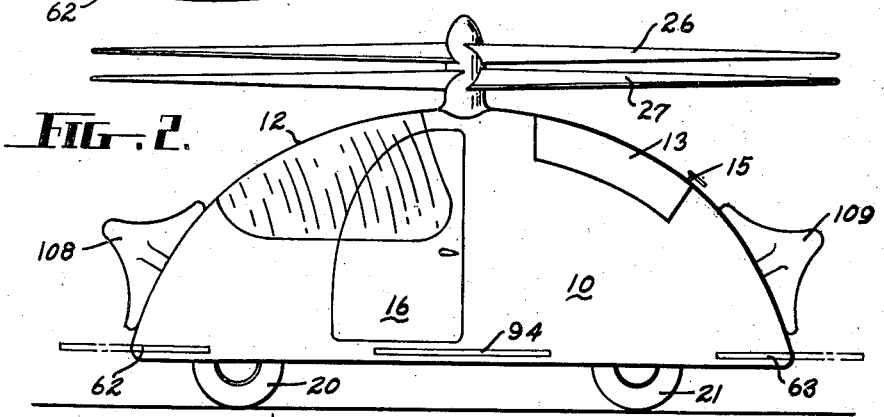
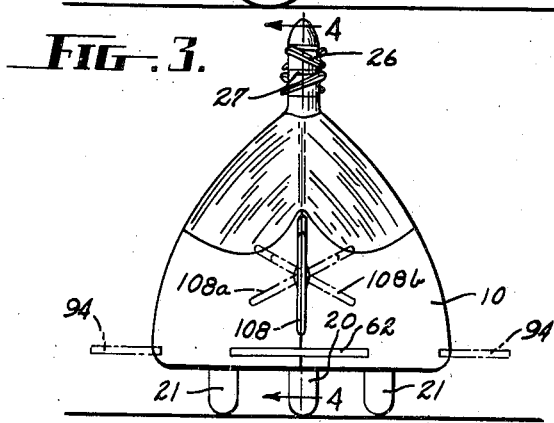
INVENTOR
JOHN M. OWEN
BY
Toulmin & Toulmin
ATTORNEYS

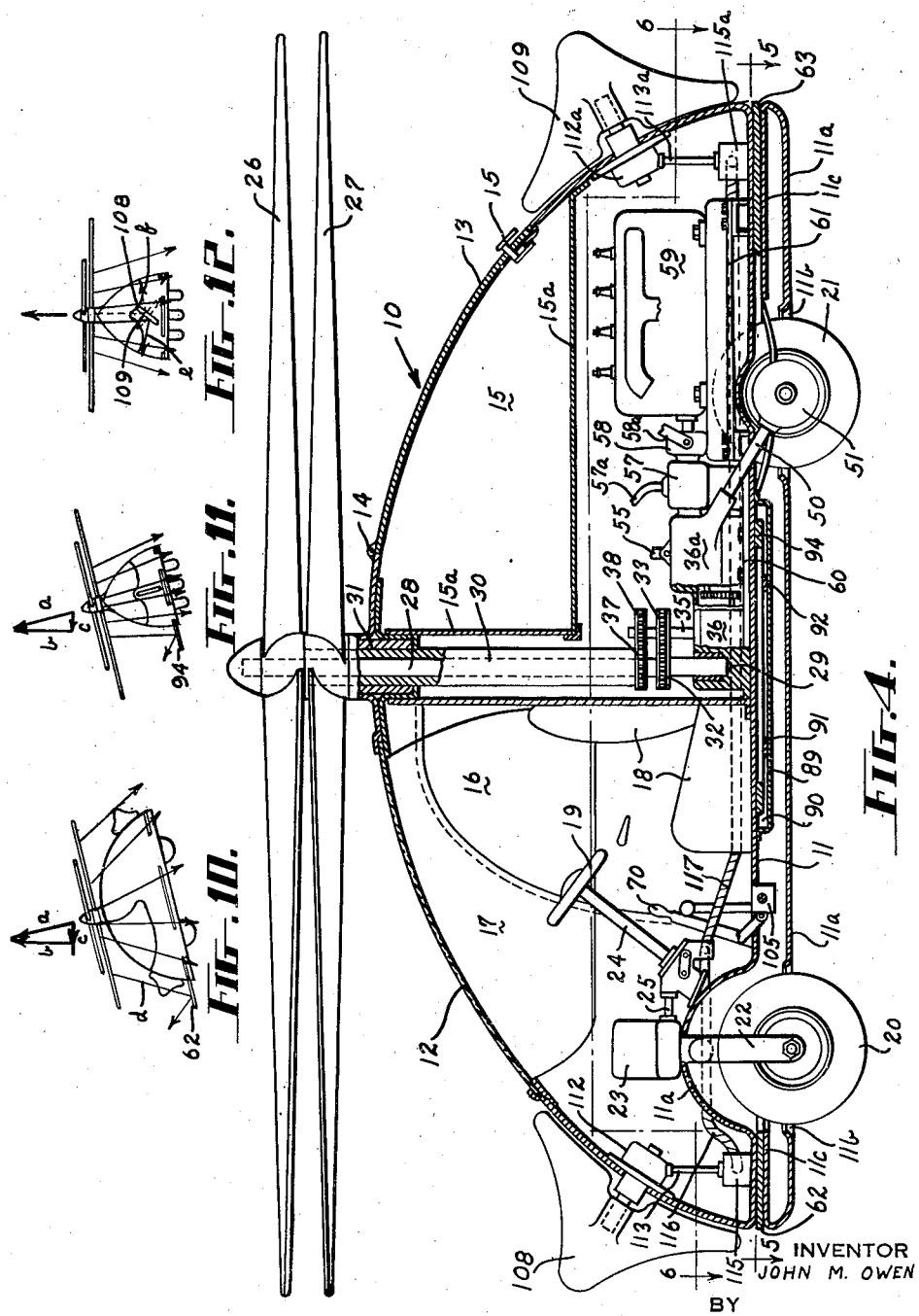

April 12, 1949.     J. M. OWEN     2,466,821
HELICOPTER
Filed Oct. 23, 1944     4 Sheets-Sheet 3
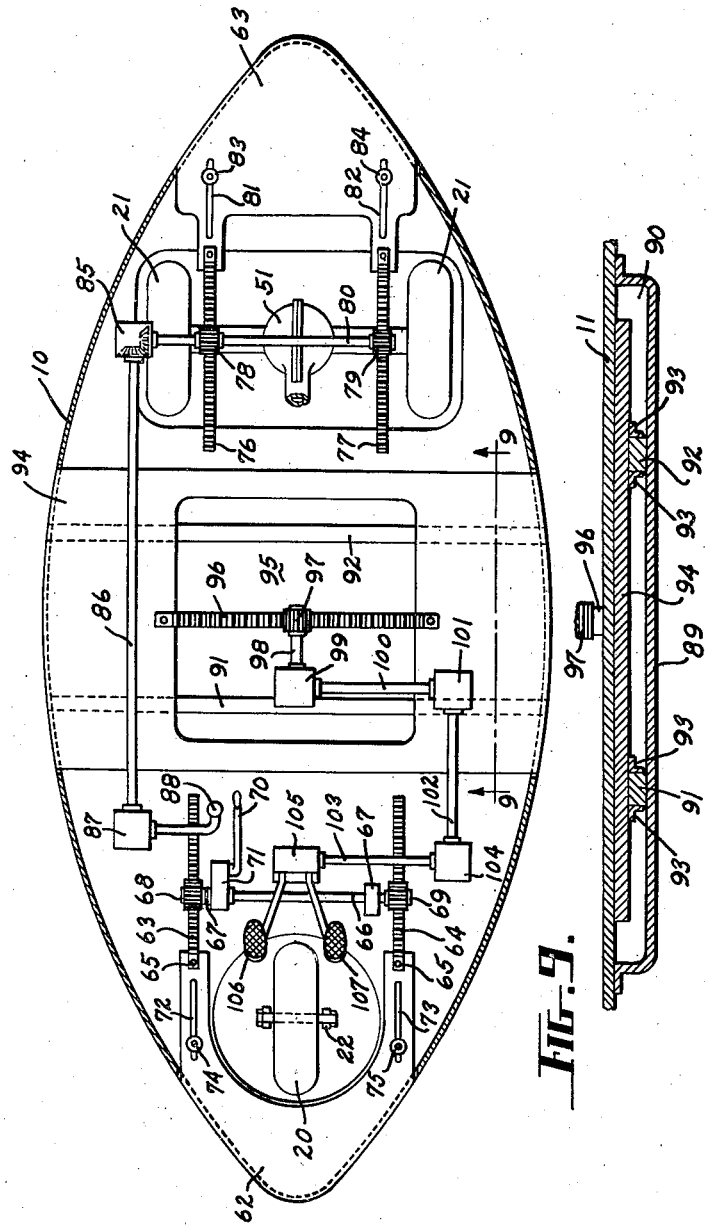
INVENTOR
JOHN M. OWEN
BY
Toulmin & Toulmin
ATTORNEYS

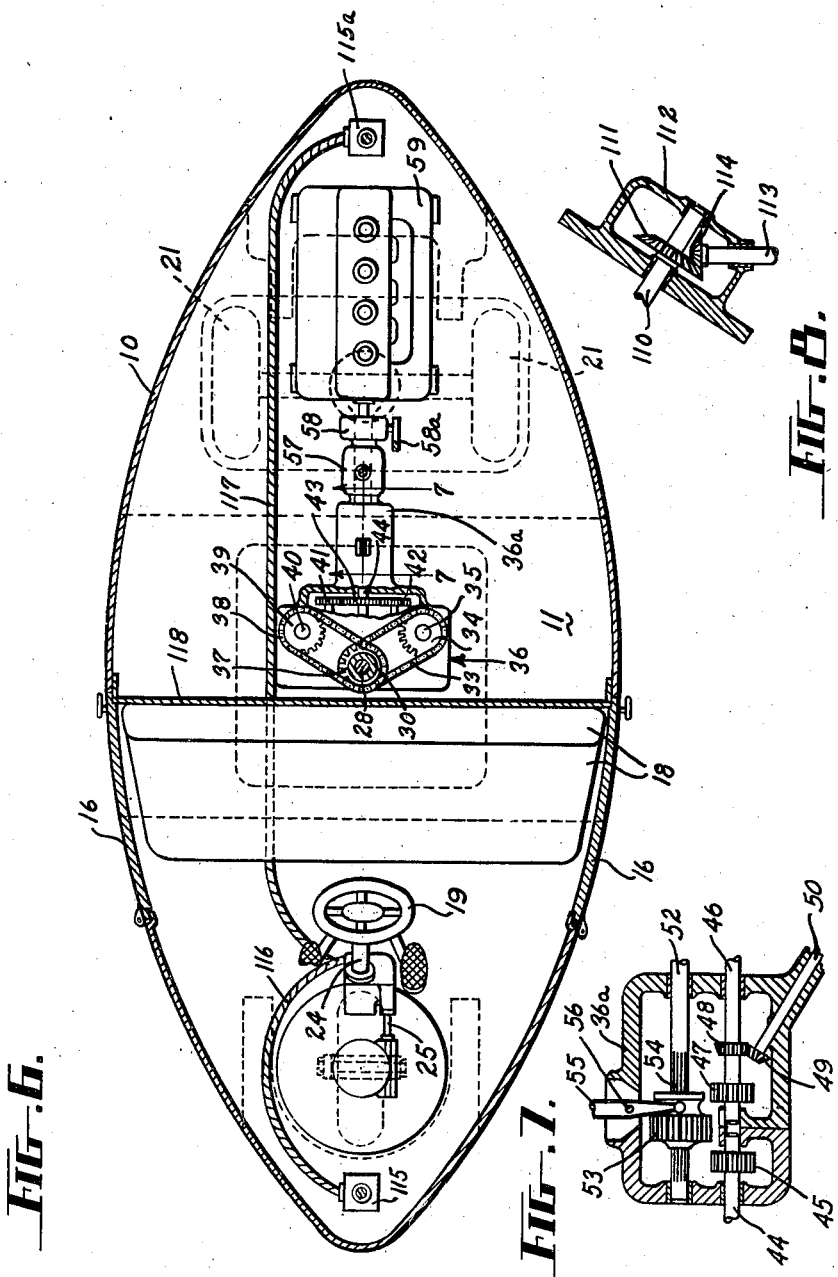

Patented Apr. 12, 1949

2,466,821

UNITED STATES PATENT OFFICE 2,466,821

HELICOPTER

John M. Owen, Fort Sill, Okla.

Application October 23, 1944, Serial No. 559,904

6 Claims. (Cl. 244—17.17)

This invention relates to helicopters or heavier-than-air craft in which the main lifting force is derived from blades or airfoil sections rotating about a substantially vertical axis.

It is an object of the invention to provide a helicopter having rotating blades in which the necessary lateral components of wing thrust are effected by control surfaces or vanes, projectable into the down-wash area of the rotor blades.

It is another object of my invention to provide a helicopter having a body in which the exterior contour of all cross sections through a central vertical axis, are symmetrical, downwardly-arcuate curves whereby the reaction forces on the body, caused by the down-wash of the rotor or rotors, are balanced about all axes through and normal to said axis.

It is a further object of my invention to provide a helicopter in which the projections of control surfaces, as aforesaid, may be combined in varying relations of projection to cause translation of the craft in any desired direction relatively to the fore and aft axis of the craft.

Another object is to provide a helicopter type vehicle that may be steered when aloft by manipulation of pivoted external vane surfaces within the rotor down-wash, and effective to apply a couple about the central vertical axis of the craft.

A still further object is to provide an aircraft of the type mentioned in the next preceding paragraph, in which wheels are provided for supporting and propelling the craft upon the ground, at least one being pivoted for steering, together with a common means for pivoting said vane surfaces and wheel.

A further object is to provide a vehicle of the type described having double, coaxial lifting rotors and a body of pleasing appearance within which are a source of power selectively connectable either to the rotors or to surface driving wheels, projectable surfaces for inducing forward, rearward, or sidewise travel, and a series of controls located for convenient manipulation by the pilot for controlling both ground and airborne travel.

Other objects and advantages of my invention will become apparent as the description proceeds.

In the drawings—

Figure 1 is a perspective view of a helicopter constructed according to my invention, using double, oppositely-rotating, coaxial rotors, and showing the general arrangement of projectable stabilizers and ailerons, as well as the rudder controls, fore and aft, Figure 2 is a side elevation of the machine of Figure 1 showing the landing and surface-propelling wheels and control surfaces, Figure 3 is a front elevation, of the machine shown at Figure 1, Figure 4 is a vertical longitudinal section taken on line 4—4, Figure 3, showing the seating and control arrangement for effecting actuation of the control surfaces, and also showing the driving motor and power connections between motor, rotors, and landing wheels, Figure 5 is a horizontal section taken substantially on the line 5—5, Figure 4 showing more particularly the symmetrical outlines of the body, the connections for effecting movement of the longitudinal and lateral control surfaces, and the arrangement of piloted-operated controls therefor, Figure 6 is a horizontal section taken substantially on line 6—6, Figure 4, and showing the power drive from motor to rotors, surface steering means, and control cables for effecting adjustment of the rudder surfaces, Figure 7 is a detail view of the means for selectively connecting power either to the rotors or to the landing and driving wheels, Figure 8 is a detail view showing the gear connections for operating and controlling the fore and aft rudder control surfaces, Figure 9 is a section on line 9—9, Figure 5, showing the mounting for one of the projectible lateral stabilizer surfaces, Figures 10, 11 and 12 are diagrammatic views illustrating the manner in which the necessary forward and lateral components of rotor thrust are produced.

Referring in detail to the drawings wherein like reference characters identify corresponding parts throughout, the numeral 10 identifies a body generally in the form of a section of an oblate spheroid and having symmetrical cross sections in fore and aft and transverse vertical planes whereby all forces transmitted thereto through the rotor slip-stream or down-wash, are normally balanced about central transverse and longitudinal axes. This particular shape of body, is of course, purely illustrative only, as numerous other shapes having the desired properties of symmetry and low resistance, are possible. The body may be formed largely of plywood, metal, plastic, or other suitable material and includes a floor 11, a transparent forward section 12 for the pilot and passengers, a rear door 13 pivoted at 14 to give access to a storage compartment 15, Figure 4. A handle and lock 15 is provided for the door. Doors 16 are provided for entrance to the passenger compartment 17, provided with a seat 18 and a conveniently located steering wheel 19. As indicated at Figures 4, 5 and 6, the vehicle has a single forward wheel 20 for steering, and two rear wheels 21 for surface traction. All three wheels cooperate, of course, to form a tricycle landing gear and suitable springs and shock absorbers, not shown, are interposed between the wheels 20, 21 and body 10 for this purpose.

Surface steering is effected by means of front wheel 20. This wheel is journaled in a fork 22 which, in turn, is journaled on a substantially vertical axis within an upwardly dished portion 11a of bottom 11 of body 10. The fork may, if desired, have a slight caster to improve stability in surface travel. The bearings journaling fork 22, are positioned within a case 23 secured to body 10. Suitable mechanical connections, are provided between a shaft within steering column 24 and fork 22, including a shaft 25, whereby turning of steering wheel 19 effects a corresponding pivotal movement of fork 22 and wheel 20 whereby surface steering may be effected. As these connections may be of any conventional type such as the irreversible worm and gear mechanism used in the steering linkage of automobiles, it is deemed unnecessary to show them. Steering wheel 19 is also connected to control deflectors for steering while in flight by means subsequently to be described.

The two rotors are indicated at 26 and 27, Figures 1 to 4, inclusive, and consist of airfoils of radially outwardly decreasing pitch as in aircraft propellers. Rotor 26 is secured to a shaft 28 journaled at its lower end in a bearing 29 and at its upper end within a sleeve or hollow shaft 30. Sleeve 30 is journaled at its top in a bearing 31 carried by suitable framework secured to body 10. By this arrangement, both shafts 28 and 30, are journaled on coincident axes fixed relatively to body 10. Referring to Figures 4 and 6, shaft 28 has a sprocket 32 fixed thereto. A chain 33 connects sprocket 32 with a second sprocket 34 secured to a shaft 35 of a transmission mechanism generally indicated at 36. Similarly, sleeve 30 has secured thereto adjacent its lower end, a sprocket 37. A chain 38 couples sprocket 37 with a second sprocket 39 fixed to a second shaft 40 of transmission 36.

Shafts 35 and 40 are driven in opposite directions of rotation by suitable gearing within transmission 36 and including a gear 41 connected to drive shaft 40, and a second gear 42 connected to drive shaft 35. Gears 41 and 42 each mesh with a single gear 43 fixed to a shaft 44. As seen in Figure 7, this shaft extends into a rearward housing 36a of transmission 36, where it has a gear 45 fixed thereto. Housing 36a also has journaled therein, on an axis coincident with the axis of shaft 44, a second shaft 46 to which are fixed a spur gear 47 and a bevel gear 48. A shaft 50, coplanar with shaft 46, and extending at an acute angle downwardly therefrom carries a bevel gear 49 in mesh with 48. As seen from Figure 4, shaft 50 extends downwardly and enters a rear axle housing 51, where it drives a differential having sun gears connected through axle shafts to the respective rear wheels 21 in the manner conventional in automobiles. Suitable splined connections and universal joints, not shown, may be provided in connection with shaft 50 to permit springing movements of wheels 21 relatively to body 10, as will be understood by those skilled in the art. Returning to housing 36a, a shaft 52 is journaled therein, parallel to shafts 44 and 46 and has a gear and collar unit 53 slidably but non-rotatably mounted thereon, as by a splined connection 54. A shifting lever 55 is pivoted at 56 on housing 36a and has a forked end having the prongs thereof engaging within the channel of unit 53. A source of power is connected to drive shaft 52 by mechanism subsequently described. Thus, unit 53 may, by actuation of lever 55 be shifted from the neutral position shown in Figure 7, to a position driving rotors 26, 27 when meshed with gear 45, or to a second position driving wheels 21 when meshed with 47. It will be understood, of course, that the drive from shaft 44 is such as to rotate rotors 26 and 27 in opposite directions whereby the necessity for a reaction torque rotor is obviated. While the rotor blades are shown as of the fixed pitch type, feathering blades of any well known construction can be used if desired.

Returning to Figures 4, 6 and 7, shaft 52 passes from housing 36a rearwardly into a variable-speed transmission 57 such as the conventional three-speeds-forward and reverse transmissions used in automobiles, and equipped with gear shifting means 57a operable by a lever on steering column 24 and connections, not shown, whereby standard automotive control is afforded. The motor 59 is connected to drive transmission 57 through a clutch 58 having a release lever 57a controllable by connections, not shown, from the pilot's seat 18. Preferably, motor 59, clutch 58, transmissions 57, 36a and 36, and rotor shafts 28 and 30, are all mounted upon a frame or subbase comprising two rigidly-united parts 60 and 61 and are pre-assembled and mounted on floor 11 as a unit through the opening afforded by door 13 and its attached body parts, prior to the installation of compartment walls 15a.

From the foregoing disclosure, the mechanical drive of my helicopter both as a surface vehicle and as an aircraft, will be apparent. Prior to take-off, the pilot shifts lever 55 into position meshing gear unit 53 with gear 47. As a result, power from motor 59 is conveyed to rear wheels 21 through clutch 58, transmission 57, shaft 52, and by the aforementioned gearing, to shafts 46, 50, and rear axle differential 51. By manipulation of clutch lever 58a and gear shift 57a, the pilot is enabled to manipulate the craft into any desired take-off location. As soon as the craft is in the desired take-off spot, lever 55 is shifted to move gear unit 53 into mesh with gear 45 whereby power to wheels 21 is disconnected and, on closing of clutch 58, power is conveyed to transmission 36 to drive rotors 26 and 27 by way of gears 43, 41, 42, 34, 39, chains 33 and 38, gears 32, 37, and shafts 28 and 30 and thus effect the necessary lift.

Propulsion of the craft forwardly and rearwardly is effected by slightly tilting the body, forwardly or rearwardly corresponding to the desired direction of travel; whereby the lifting thrust of the rotors which is always parallel to shaft 28, has a component in the desired direction of travel. This is illustrated in Figure 10, where component $a$ represents the total effective rotor thrust, $b$ represents the component of force $a$ sustaining the craft against the pull of gravitational forces, and $c$ represents the component of force $a$ propelling the craft forwardly. Obviously, when the craft is tilted rearwardly, component $c$ is in a direction reverse from that shown at Figure 10, and causes the craft to travel backwards. This tilting is controlled by elevator plates 62 and 63 now described.

A sub-floor 11a, Figure 4, has openings 11b to accommodate wheels 20 and 21, and is formed with guide surfaces 11c spaced from main floor 11 by a distance substantially equal to the thickness of elevator plates 62 and 63. These plates are shaped as clearly shown upon Figure 5 to have such contour as to lie flush with the body 10 when in fully retracted position. Elevator 62 is connected to be slid into forwardly projected position by spaced parallel racks 63 and 64 firmly connected to elevator 62 at 65. A shaft 66 is journaled in bearings 67 carried by floor 11 and carries at one end a gear 68 meshing with rack 63, and at its other end, a gear 69 meshing with rack 64. A lever 70 is located in a position convenient to the pilot and is connected to rotate shaft 66. Preferably, this connection includes reversing gears in a gear box 71 secured to floor 11, whereby, when lever 70 is thrust forwardly, plate 62 is projected forwardly and forward tilt and motion are induced. If desired, plate 62 may be provided with slots 72, 73 parallel to racks 63, 64. Guide pins 74 and 75 secured in floor 11 and 11c pass through the respective slots and thus act to steady elevator 62 and assure that its motion is limited strictly to fore and aft translation in its own plane.

Rear elevator plate 63 is mounted and controlled for rearward projection from body 10, in exactly the same manner as forward plate 62, by racks 76, 77, gears 78, 79, shaft 80, and, if desired, slots 81 and 82 and guide pins 83 and 84. In view of the duplicate parts it is deemed unnecessary to describe this construction in detail. However, shaft 80 extends into a gear box 85 where it is connected by conventional bevel gearing, to a shaft 86 extending forwardly to a second gear box 87 located in the pilot's compartment and connected by bevel gearing within said box, to a control lever 88. Thus, as lever 88 is drawn back, plate 63 is projected. While the elevator plates 62 and 63 have been illustrated as being controlled by separate control levers, it will be understood that they can be controlled from a single lever, and that such single lever control is within the full contemplation of my invention.

It will be noted that the body 10 of my craft is symmetrical in all fore-and-aft and transverse vertical planes. Thus the slip stream of rotors 26, 27, when both elevator plates are fully retracted, has equal reaction upon the body 10 on opposite sides of a transverse plane through the axis of shaft 28. However, when plate 62, for example, is projected, these reactions become unequal because of the added reaction surface afforded by said plate. As a result thereof, when the craft is in sustained flight, body 10 is tilted forwardly to a degree approximately proportional to the projected area of said plate. This is illustrated in Figure 10, where elevator plate 62 has been projected forwardly to create an additional reaction $d$ at the nose of the craft. As a result the craft is tilted forwardly to develop the component $c$ necessary for forward propulsion. Obviously, the forward air speed is proportional to the value of component $c$, while, for constant-altitude flight, component $b$ must at all times equal the weight of the craft.

Referring to Figures 4, 5 and 9, floor 11 has attached therebeneath, an offset plate 89 forming with the floor, a transversely-extending slot 90. Parallel transverse guide strips 91 and 92 are secured to plate 89 and are slidably engaged by angles 93 secured in spaced parallel relation to an aileron plate 94. This plate is shaped as shown at Figure 5 to conform to the contour of body 10, when in central position, and has a lightening cut-out 95. Thereby, plate 94 is slidable transversely of the craft for variable projection either to the right or to the left. Such projection is effected and controlled by a rack 96 secured to plate 94 and extending parallel to strips 91 and 92. A shaft 98 has a pinion 97 thereon in mesh with rack 96. Said shaft extends into a gear box 99 where it is connected by bevel gear, not shown, with another shaft 100. Shaft 100, in turn is connected by bevel gears in box 101, with a shaft 102, in turn connected with a shaft 103 by bevel gears within a gear box 104. Shaft 103, at its end opposite box 104, projects into a casing 105 where it is connected to means wherein pressure on pedal 107 causes rotation of shaft 103 in the direction necessary to move aileron plate 94 downwardly, as seen in Figure 5, while pressure on pedal 106 causes rotation of shaft 103 in the opposite direction to move plate 94 upwardly. Such a coupling may conveniently be formed by connecting one pedal directly to shaft 103 and the other pedal to a gear loose on shaft 103 and driving a gear fixed to shaft 103 through a reversing gear connection whereby pressure on the respective pedals rotates shaft 103 in respective opposite directions. Of course, if the craft is large, the various movements controlled by levers 70, 88, pedals 106, 107 and wheel 19 will be effected through electrically or fluid pressure operated servo-motors and follow-ups in a manner well known to those skilled in the art.

Referring to Figure 11, it will be noted that aileron plate 94 has been projected to the left as seen in said figure and that, similarly to the action of elevator plates 62 and 63, plate 94 increases the reaction to the slip stream or rotor down-wash on that side. As a result the craft is tilted as shown, and the total rotor thrust $a$ then has a horizontal component $e$ causing transverse movement of the craft in the direction of tilt. Obviously, by simultaneously projecting plate 94 in one or the other direction and either of plates 62 or 63, the component $c$ may be given any direction relatively to the fore-and-aft axis of the craft so that the craft may be moved in any direction without alteration of its heading.

A rudder vane 108 is pivoted on body 10 at the front thereof, on an upwardly and forwardly inclined axis. A similar vane 109 is pivoted at the rear upon an upwardly and rearwardly inclined axis. Referring to Figure 8, vane 108 is fixed to a shaft 110 having a bevel gear 111 attached thereto within a casing 112. A second shaft 113 extends within casing 112 attached to body 10. Said shaft has fixed thereto a bevel gear 114 meshing with gear 111. Shaft 113 extends downwardly into a gear box 115 where it is connected, by conventional bevel gears therein, with a flexible cable drive 116, extending to, and connected to be driven by rotation of steering wheel 19. Vane 109 is controlled by connections similar to those controlling vane 108 and hence given the same reference characters with lower case $a$ added. Thus it is not necessary to describe them in detail. A second flexible shaft drive 117 extends forwardly from gear box 115a to a connection with the shaft in steering column 24. The connections from steering wheel 19 to flexible shaft drives 116 and 117 are such that, when wheel 19 is in a position corresponding to forward surface travel, both vanes 108 and 109 are positioned in a central longitudinal vertical plane. Also when wheel 19 is rotated to the left as viewed by the pilot, vane 108 is turned counter-clockwise, while vane 109 is turned in the opposite direction. This is the position shown at 108a, Figure 3. As a result, the reaction of the down-wash against the vanes creates an unbalance couple e, f, Figure 12, around the vertical central axis of the craft resulting, in the illustrated condition, in a turn to the left. Similarly, when a turn to the right is desired, the steering wheel is turned to the right to rotate vane 108 clockwise into position 108b, Figure 3, and vane 109 counter-clockwise, whereby to create a couple acting to turn the craft to the right. As the vanes 108 and 109 are of equal effective area and are coupled for synchronous rotation albeit in opposite directions, their reaction components in a longitudinal vertical plane are equal and no forward or backward tilt is produced. Similarly, as the vanes are symmetrical about their pivot axes, and as such axes lie in the longitudinal vertical plane of the craft, rotation of said vanes is ineffective to cause lateral tilt. Hence only turning couples are applied thereby.

The manner in which my craft is propelled and steered while on the ground, has already been described. Upon arriving at a desired take-off spot, power is disconnected from wheels 21 and applied to rotors 26 and 27 by shifting lever 55, the throttle of motor 59 is opened and rotors 26 and 27 are spun to effect a total lift in excess of the craft weight. The craft then rises vertically and, by proper control of the motor may be made to hover over the take-off spot or, by operation of levers 70, 88 and pedals 106, 107, made to move laterally in any direction. After the craft reaches the desired altitude it is headed in the proper direction by manipulation of wheel 19. Thereupon, lever 70 is thrust forwardly to tilt the craft forwardly whereby the resulting horizontal component of rotor lift causes the craft to move ahead. Vertical movement can, to some extent, be controlled by simultaneous projection of front and rear elevator surfaces 62, 63, whereby the effective rotor lift is reduced by equal amount at front and rear. Protection to the pilot and other occupants is provided by a bulkhead or wall 118 separating the motor and transmission compartment from the passengers' compartment. Pilot-controlled brakes for wheels 20 and 21 are contemplated in the commercial form.

Thus I have provided a helicopter that is symmetrical and pleasing in appearance, relatively simple and inexpensive to construct and that can be propelled over the ground under its own power to any desired take-off spot. The control surfaces being at the maximum possible distance radially of the center of thrust of the rotors, make the craft instantaneously responsive and provide ease of control since only a relatively small area of projection will ordinarily afford the desired forward, rear or lateral movement.

While I have shown my helicopter in the form now preferred by me, it will be clear that numerous changes, alterations and substitutions may be made without in any way affecting the basic principles of operation. I wish it to be understood that I reserve all such changes, alterations and substitutions as fall within the scope of the sub-joined claims.

Having now fully described my invention, what I desire to claim and secure by U. S. Letters Patent is:

1. In a helicopter, a body symmetrical about a vertical axis, a rotor journaled on said body for rotation on said axis, substantially coplanar control surfaces at the nose and tail of said body and normally entirely within said body, each said surface being projectable flatwise into the slip stream of said rotor at locations remote from said axis whereby to create tilt of said axis and corresponding horizontal components of said rotor thrust, and a third control surface coplanar with the other said surfaces in said body and projectable laterally thereof into the down-wash of said rotor to cause a component of movement of said craft corresponding to the tilt produced by said third surface.

2. A helicopter comprising a body symmetrical about a central vertical axis, a rotor journaled in said body for rotation on said axis and effective to create a sustaining lift, coplanar control surfaces carried normally entirely within said body and projectable therefrom forwardly, rearwardly and laterally into the down-wash from said rotor at locations remote from said axis, whereby to create a reaction tilting said axis in a desired direction of travel, and a steering vane pivoted on said body on an axis having a fore and aft projection, said vane being located within the down-wash of said rotor to create a torque turning said body on pivoting of said vane.

3. A helicopter comprising a body symmetrical about a central vertical axis, a rotor journaled in said body for rotation on said central axis and effective to create a sustaining lift, coplanar control surfaces carried normally entirely within said body and selectively projectable therefrom forwardly, rearwardly and laterally into the down-wash from said rotor at locations remote from said axis, whereby to create a reaction tilting said axis in a desired direction of travel, vanes pivoted on said body at the nose and tail thereof on axes having fore and aft projections, each said vane being positioned within the down-wash of said rotor, and means connecting said vanes for opposite directions of rotation whereby to apply a steering couple to said body about the rotor axis.

4. In a helicopter, a body symmetrical about a central vertical axis and of a form such that all external cross sections on longitudinal and transverse vertical planes, are downwardly arcuate, said body having a substantially plane floor, rotors co-axially journaled on said body on said central vertical axis, power means rotating said rotors in opposite directions to create a sustaining lift, and coplanar control surfaces slidably mounted on said floor and projectable into the down-wash of said rotors and substantially normal to the said downwash at locations remote from, and circumferentially spaced about the axis of said rotors.

5. In an aircraft of the helicopter type, a body, a sustaining rotor journaled on said body for rotation on a substantially vertical axis centrally of said body, power means in said body connected to spin said rotor, a first control surface at the front of said body, a second control surface at the rear of said body, a third control surface centrally of said body, said surfaces being substantially coplanar and normal to the axis of said rotor and positionable completely within said body, means mounting said first and second surfaces for forward and rearward projection, respectively, into the effective downward projection of the path of said rotor, vanes pivoted on and exteriorly of said body at the front and rear thereof on axes having a fore and aft projection, said vanes being located within the effective downward projection of the path of said rotor, and pilot-controlled means coupling said vanes for opposite directions of rotation.

6. In a craft adapted for both air and ground travel, a body, a lifting rotor journalled in said body for sustaining and driving the craft in flight, ground wheels carried by said body for supporting the craft during ground travel, a power plant carried by said body, means selectively operable to connect said power plant with said rotor or with at least one of said ground wheels, control means for controlling the direction of said craft during ground travel, and other control means for controlling the direction of said craft during flight comprising reaction panels carried by said body and extendable therefrom into the downwash of said lifting rotor for giving the craft a predetermined tilt to produce a horizontal component of thrust by the said rotor, said reaction panels being retractable completely within the limits of said body during ground travel of the said craft.

JOHN M. OWEN.

REFERENCES CITED

The following references are of record in the file of this patent:

UNITED STATES PATENTS

| Number | Name | Date |
| --- | --- | --- |
| 1,378,112 | Hewitt | May 17, 1921 |
| 1,388,642 | Haupt | Aug. 23, 1921 |
| 1,455,352 | Overbeek | May 15, 1923 |
| 1,743,378 | Neubauer | Jan. 14, 1930 |
| 1,819,863 | Bleecker | Aug. 18, 1931 |
| 2,070,610 | Myers | Feb. 16, 1937 |
| 2,135,073 | Gerhardt et al. | Nov. 1, 1938 |

FOREIGN PATENTS

| Number | Country | Date |
| --- | --- | --- |
| 23,086/35 | Australia | June 18, 1936 |